United States Patent
Sakellarides et al.

(10) Patent No.: US 9,156,966 B2
(45) Date of Patent: Oct. 13, 2015

(54) ADDITION OF NON-REACTIVE UV ABSORBERS DURING POLYESTER SYNTHESIS

(71) Applicant: TORAY PLASTICS (AMERICA), INC., North Kingstown, RI (US)

(72) Inventors: Stefanos L Sakellarides, East Greenwich, RI (US); Gordon Vincent Sharps, Jr., North Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 3 days.

(21) Appl. No.: 14/145,354

(22) Filed: Dec. 31, 2013

(65) Prior Publication Data
US 2015/0183957 A1 Jul. 2, 2015

(51) Int. Cl.
*C08K 5/34* (2006.01)
*C08K 5/3492* (2006.01)

(52) U.S. Cl.
CPC .................... *C08K 5/3492* (2013.01)

(58) Field of Classification Search
CPC ....................................... C08K 5/34
USPC .......................................... 523/333; 524/100
See application file for complete search history.

(56) References Cited

U.S. PATENT DOCUMENTS

2014/0113997 A1* 4/2014 Winrow et al. ................. 524/91

* cited by examiner

*Primary Examiner* — Edward Cain
(74) *Attorney, Agent, or Firm* — Pillsbury Winthrop Shaw Pittman LLP

(57) ABSTRACT

A method of incorporating a UV light absorber into a polyester during the esterification or the condensation process by selecting the UV absorber from a class that is substantially not reactive with the polyester raw materials, is stable in the conditions of polycondensation or polymerization, and does not suffer loss through volatilization, resulting in an incorporation yield of 70% or higher, preferably 90% or higher. One embodiment comprises selecting the appropriate compound from the class of triazines and incorporating is as a solid powder in the beginning of the esterification. Another embodiment comprises selecting the appropriate compound from the class of triazines and incorporating it in the form of slurry during the time interval between esterification and condensation. Other embodiments include novel resins and films made by the UV absorber containing polyester resin made by the methods disclosed herein.

19 Claims, 1 Drawing Sheet

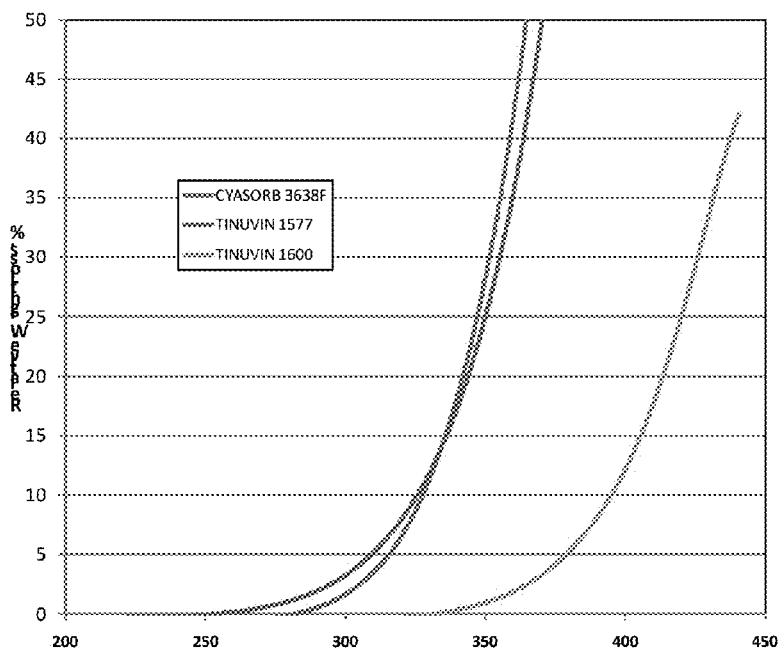
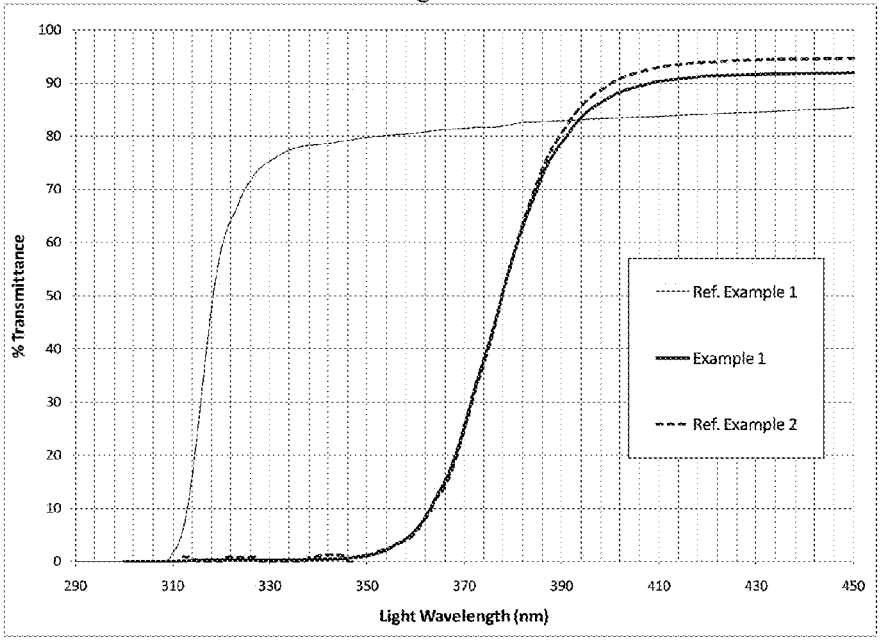

ADDITION OF NON-REACTIVE UV ABSORBERS DURING POLYESTER SYNTHESIS

FIELD OF INVENTION

This invention relates to a method of producing a polyester resin comprising a UV absorber added during the polyester polymerization process (hereinafter this polyester resin is referred to as "UV absorber containing polyester resin" and abbreviated as "UVACPER") and to a biaxially-oriented polyester film comprising the UVACPER. This invention also relates to multi-layer biaxially oriented polyester films and laminates of same comprising the UVACPER. In one particular embodiment of the UVACPER, the base resin is polyethylene terephthalate (abbreviated as "PET") homopolymer or copolymer. The UVACPER films exhibit excellent stability against prolonged sunlight exposure as well as provide protection against sunlight. The UVACPER films are more economical, more uniform with regard to additive dispersion, and less complicated to produce versus UV absorber containing polyester resin films made by adding the UV absorber by blending in chip concentrates of the UV absorber into polyester resin pellets and coextruding this blend of chip concentrates and polyester resin pellets.

BACKGROUND OF INVENTION

Polyester resins are often used in a variety of applications where stability against the deleterious effects of UV radiation found in sunlight is critical. These effects may concern the stability of the resin itself or the stability of the substance present on the other side. Of particular concern is the UV light at wavelengths between 320 and 390 nm, which are present in sunlight and which are being transmitted through standard PET.

One example of such need for protection are clear containers commonly used to store beverages, detergents, cosmetics and other products whose color or content (such as vitamins or flavor components) is sensitive to UV light.

Another example is fibers, used for example in outdoor applications such as woven signs, awnings, or outdoor garments that must provide skin protection to the wearer.

Other examples are clear extruded sheets used outdoors, for example as awnings, greenhouse roofs, advertising signs, etc.

Other examples yet are biaxially-oriented films. Biaxially oriented polyester films are often used in applications where stability to prolonged exposure to sunlight is critical. Such applications include weatherproof solar shell back sheets and clear window films.

In the case of solar cell back sheets, where clarity is not an issue and often undesirable, the most cost-effective was to impart UV resistance is by incorporating whitening agents such as titanium oxide or barium sulfate. However such films suffer from haze and are not suitable for production of films used in applications requiring good transparency, such as window films.

Such window films must often have very low haze in order to satisfy end-user applications. At the same time, they require ease in handling and processing and scratch resistance. This dual requirement is accomplished for example by incorporating particles, offering anti-block, slip, and anti-scratch characteristics but have a size below or within the range of visible light wavelength so as to prevent significant light diffraction that would result in haze. A very tangible benefit is the significant reduction of high angle sun haze, a factor in many solar applications.

Window films are often dyed or metalized (to an optical density that still leaves the film transparent to visible light) or have ceramic coated applied to convert incoming solar radiation to infrared radiation, which is then rejected back through the glass to the exterior.

The adhesive system used in window films rejects UV Radiation up to 380 nm. As UV is one of the main sources of fading, it can prolong the life of fixtures and fittings. Specialty UV Window Films are available that offer increased protection to 400 nm, through incorporation of high-performance UV absorbers, which also increase the shelf life of the film itself.

UV absorbers are compositions which absorb light in the wavelength area where PET is transparent to UV light and thus susceptible to damage by the energy absorbed. In doing so they consume the light energy themselves and thus it is not available for damaging the polyester.

UV absorbers are typically incorporated in the form of pre-compounded chip concentrates ("masterbatches") in the manufacturing of polyester articles, such as bottles, fibers, and films. Such masterchips are produced during a separate step involving kneading the polymer pellets together with the UV absorber in a twin screw extruder which allows precise metering. This process adds additional cost. Furthermore, due to the thermal degradation high IV more expensive ship has to be used in forming the masterbatch.

A typical UV concentrate "masterchip" is formulated with a UVA content between 10-20% by weight U.S. Pat. No. 4,617,374 describes the incorporation of a UV absorbing species belonging in the methane family and possessing a hydroxyl and a methyl ester end-group at the beginning of the esterification by a condensation reaction. U.S. Pat. No. 7,541,407 describes the incorporation of similar compounds after the esterification step and before the vacuum polycondensation step; the incorporation yields reported in the examples (25%, 44% and 77%) suggest that significant amount is lost due to volatility.

SUMMARY OF THE INVENTION

An embodiment relates to a method for making a UV absorber containing polyester resin (UVACPER) comprising selecting a UV absorber that has (1) less than 5 percent weight loss as measured by thermo-gravimetric analysis when heated from room temperature to 300° C. at 20° C./minute and (2) substantially no reactive end group that can react with the precursor during the method of making UVACPER; and adding the UV absorber into a precursor for making the UVACPER prior to a vacuum condensation reaction of the precursor.

The embodiments herein relate to a method of producing a polyester resin comprising a UV absorber added during the polyester polymerization process and biaxially oriented polyester film comprising such polyester resin. This invention also relates to multi-layer biaxially oriented polyester films and laminates of same, which are made from at least one polyester building block, comprising a UV absorber added during the polyester polymerization process. One particular embodiment of such a film-forming polyester is polyethylene terephthalate (abbreviated as "PET") homopolymer or copolymer. Such films exhibit excellent stability against prolonged sunlight exposure as well as providing protection against sunlight and are more economical, more uniform with regard to additive dispersion, and less complicated to produce versus adding the UV absorber by blending in chip concentrates.

Another embodiment relates with the selection of the UV absorbing species such that it meets certain requirements that facilitate its in-situ incorporation in polyester polymerization at yields exceeding 80%, without significant chemical alteration. This requires selecting a UV absorber that is thermally stable and has low volatility at the conditions of polymerization. One particular embodiment of that selection is the family of triazines and benzotriazoles.

Other embodiment is a polyester resin and film comprising a UV absorber incorporated in-situ, said polyester selected from the group of polyethylene terephthalate, polyethylene naphthalate, polybutylene terephthalate, polytrimethylene terephthalate, polyethylene terephthalate-co-isophthalate copolymer, polyethylene terephthalate-co-naphthalate copolymer, polycyclohexylene terephthalate, polyethylene-co-cyclohexylene terephthalate, etc. and other ethylene glycol or terephthalic acid-based polyester homopolymers and copolymers and blend combinations thereof.

Another embodiment is a film made from blend of a polyester with a UV absorber incorporated in-situ with an unmodified polyester; or multilayer film containing different levels of UV absorber in various layers, tailored by blending polyester containing a UV-absorber incorporated in-situ with an unmodified polyester at different levels for each layer.

BRIEF DESCRIPTION OF THE DRAWINGS

FIG. 1: Weight loss of certain UV absorbers by thermogravimetric analysis.

FIG. 2: Light transmission as a function of wavelength of light for certain resin samples.

DETAILED DESCRIPTION OF THE INVENTION

The term "substantially no reactive end group that can react with the precursor during the method of making UVACPER" means that there is no observable early chain termination effects during polymerization, i.e. high molecular weight polymer (inherent viscosity identical to that obtained by a control reaction when no in-situ incorporation of the IV absorber takes place) is achieved during the vacuum polycondensation step.

In one embodiment of the invention, a method for incorporating a UV absorber in a polyester resin "in-situ," i.e. during the polymerization process, is provided. This method comprises the following steps:

Step 1: Selection of a suitable UV absorber based on the following criteria:
  A. Absorption of UV light at the desired wavelength range. This is determined by dissolving a sufficiently low concentration (to prevent saturation) of the UV absorber in a polar solvent such as chloroform or dichloromethane and placing the solution in a quartz cuvette into a UV-spectrophotometer; and obtaining a UV spectrum (typically in the range 300-400 nm) by instrumental procedures well-known to those skilled in the art. A quantitative measure of the effectiveness of the UV absorber is obtained by calculating extinction coefficient as follows: $\epsilon = -\log T/(c*d)$, where $\epsilon$ is the extinction coefficient at a particular wavelength, c is the absorber concentration and d is the light path (e.g. film thickness).
  B. Volatility at the conditions of polymerization. Low or no volatility is preferable; high volatility, in addition to material loss would have practical implications such as clogging of vacuum lines, fouling of the reactor, etc. One way to assess volatility is by examining the material's behavior during TGA (thermo-gravimetric analysis).
  C. Stability (absence of reactivity) at the polymerization conditions. A predictor of that behavior is the absence of functional groups such as hydroxyl (other than directly attached to an aromatic group), carboxyl, carbonyl, amine, etc. In the case that such functional groups are present in the UV absorber one could potentially envision an embodiment that it would be possible to end-cap a UV absorber such that the end-capped UV absorber has substantially no reactive end group that can react with the precursor during the method of making UVACPER. Examples of suitable end-cappers are monofunctional carboxylic acids, alcohols, amines, etc. depending on the nature of the functional end-group.

One example of such a class of suitable UV absorbers that can be incorporated in-situ are triazines having molecular weight of 400 g/mol or higher and a stability against volatility manifested by weight loss at 370° C. of less than 50%.

One embodiment of UV absorber additives suitable for this invention are triazine typos of UVA (UV absorbent) compounds. Examples are 28; 2,2'-methylene bis[6-(2H-benzotriazol-2-yl)-4-1,1,3,3-tetramethylbutyl)phenol], commercially available from BASF as Tinuvin 360; 2-(4,6-diphenyl-1,3,5-triazin-2-yl)-5-hexyloxyphenol commercially available from BASF under trade name Tinuvin 1577 ED; higher molecular weight triazines of the type described in U.S. Pat. No. 7,265,171, such as 2,4-bis-biphenyl-6-[2-hydroxy-4-(2-ethyl-hexyloxy)phenyl]-1,3,5-triazine.

A polyester polymerization process consists of various stages that take place in multiple steps within the same vessel (one pot preparation) or in multiple vessels, each used for a specific step, and can be batch or continuous. However all types of polyester polymerization comprise three essential steps:
  A. Slurry preparation, where a solid dicarboxylic acid or a dicarboxylic acid dimethylester typically in powder or flake form is mixed with ethyleneglycol.
  B. Pressure Esterification (in the case of diacid) or Atmospheric transesterification, at elevated temperatures resulting in low molecular weight ester combinations of the diacarboxylic acid and ethyleneglycol.
  C. Vacuum polycondensation at conditions of elevated temperature and high vacuum to facilitate complete removal of esterification byproducts (water, ethyleneglycol) thus driving the reaction to build high molecular weight chains.

The UV absorber can be added at any step or interval in the above described sequence. If added in the beginning of the process, slurry preparation, it can be added in the original solid (typically powder) form.

A preferable point of addition is between the pressure esterification and the vacuum polycondensation step. During this time interval, where the reaction mixture is held at atmospheric pressure, polycondensation catalysts and other additives (stabilizers, colorants, etc.) are typically added also. A preferable mod of addition in this stage is in the form of slurry in ethylene glycol or a molten stream of the additive.

The resulting resin can be used in film preparation either by itself or in blends and coextruded layers comprising other polyester resins. In one set of embodiments, the resin containing the UV absorber incorporated in-situ is a crystalline polyethylene terephthalate and can be uniaxially or biaxially oriented. These resins have intrinsic viscosities between 0.60 and 0.85 dl/g, a melting point of about 255-260° C., a heat of fusion of about 30-46 J/g, and a density of about 1.4. The resulting film is typically 2 μm to 350 μm in thickness after biaxial orientation, preferably between 3 μm and 50 μm, and more preferably between 12 μm and 23 μm in thickness.

The film could further include other additives. Additional preferred additives in the layer include antiblock and slip additives. These are typically solid particles dispersed within the layer effectively to produce a low coefficient of friction on the exposed surface of the layer. This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications include amorphous silica particles with mean particle size diameters in the range of 0.050-0.1 μm at concentrations of 0.1-0.4 mass-percent, calcium carbonate particles with a medium particle size of 0.3-1.2 μm at concentrations of 0.03-0.2 mass-percent. Precipitated alumina particles of sub-micron sizes may be used with an average particle size, for example, of 0.1 μm and a mass-percent of 0.1-0.4. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated.

The polyester resin layer preferably includes 50 to 100 ppm of a conductive metal compound, preferably manganese (Mg) and/or magnesium (Mn). The conductive metal compound can be added during the polymerization process as a catalyst or additive, or during the extrusion process in a masterbatch form to secure enough conductivity for electric pinning in the film-making process. Less than 50 ppm of the metal compound may cause pinning issues, more than 100 ppm of the metal compound may degrade the hydrolysis and transparency performance.

Examples of manganese compounds that may be used include manganese chloride, manganese bromide, manganese nitrate, manganese carbonate, manganese acetylacetonate, manganese acetate tetrahydrate and manganese acetate dihydrate. Examples of magnesium compounds that may be used include magnesium chlorides and carboxylates. Magnesium acetate is a particularly preferred compound.

Additional additives, for example, phosphorous (P) can be used to suppress coloring (yellowness) of the polyester and can be added in an amount of between 30 to 100 ppm. Less than 30 ppm may not sufficiently reduce undesirable coloring of the film, but more than 100 ppm may make the film hazier.

The phosphorus-based compound is preferably a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, or a phosphine-based compound from the standpoint of thermal stability, suppression of debris, and improving hue. Phosphoric acid-based and phosphonic acid-based compounds are particularly preferable.

Other embodiments can comprise multi-layer films. Each layer can contain the same or different proportion of the in-situ incorporated UV absorber. Typically the core layer B comprises the bulk of the film structure, whereas each skin layer has a thickness after biaxial orientation between 0.1 and 10 μm, preferably between 0.2 and 5 μm, and more preferably between 0.5 and 2.0 μm.

The outer layers A and C can include antiblock and slip additives for controlling COF and web handling. These are typically solid particles dispersed within the outer layer to produce a low coefficient of friction on the exposed surface of the outer layer(s). This low coefficient of friction helps the film to move smoothly through the film formation, stretching and wind-up operations. Without such antiblocking and slip additives, the outer surfaces would be more tacky and would more likely cause the film being fabricated to stick to itself and to processing equipment causing excessive production waste and low productivity.

Examples of antiblock and slip additives that may be used for polyester film applications include amorphous silica particles with mean particle size diameters in the range of 0.050-0.1 μm at concentrations of 0.1-0.4 mass-percent, calcium carbonate particles with a medium particle size of 0.3-1.2 μm at concentrations of 0.03-0.2 mass-percent. Precipitated alumina particles of sub-micron sizes may be used with an average particle size, for example, of 0.1 μm and a mass-percent of 0.1-0.4. Additional examples include inorganic particles, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective. As examples of organic particles, vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene.

In general, a preferred extrusion process for producing the polyester film, masterbatch and crystallizable polyester feed particles are dried (to preferably less than 100 ppm moisture content) fed to a melt processor, such as a mixing extruder. The molten material, including the additives, is extruded through a slot die at about 285° C. and quenched and electrostatically-pinned on a chill roll, whose temperature is about 20° C., in the form of a substantively amorphous prefilm. The film may then be reheated and stretched longitudinally and transversely; or transversely and longitudinally; or longitudinally, transversely, and again longitudinally and/or transversely. The preferred is sequential orientation of first longitudinally, then transversely. The stretching temperatures are generally above the Tg of the film polymer by about 10 to 60° C.; typical machine direction processing temperature is about 95° C. Preferably, the longitudinal stretching ratio is from 2 to 6, more preferably from 3 to 4.5, with typical transverse direction processing temperature about 110° C. Preferably, the transverse stretching ratio is from 2 to 5, more preferably from 3 to 4.5. Preferably, any second longitudinal or transverse stretching is carried out at a ratio of from 1.1 to 5. The first longitudinal stretching may also be carried out at the same time as the transverse stretching (simultaneous stretching). Heat setting of the film may follow at an oven temperature of about 180 to 260° C., preferably about 220 to 250° C., typically at 230° C., with a 5% relaxation to produce a thermally dimensionally stable film with minimal shrinkage. The film may then be cooled and wound up into roll form.

As described previously, one or both sides of the film can be coated or treated for adhesion promotion, surface conductivity, higher wetting tension etc. Preferred treatments include known methods such as corona treatment, plasma treatment, flame treatment, corona treatment in a controlled atmosphere of gases, and in-line coating methods.

Test Methods

The various properties in the following examples were measured by the following methods:

The UV-additive content in the "in-situ stabilized" resin is quantitatively determined by NMR or HPLC analytical methods well known to those skilled in the art.

Intrinsic viscosity (IV) of the film and resin were tested according to ASTM D 460. This test method is for the determination of the inherent viscosity of poly(ethylene terephthalate) (PET) soluble at 0.50% concentration in a 60/40 phenol/1,1,2,2-tetrachloroethane solution by means of a glass capillary viscometer. An IV of 0.65 to 0.75 is considered good for film.

DEG (diethylene glycol) content was determined by gas chromatography following hydrolyzing the resin I a heated mixture of MeOH/NaOH with DMSO present, adding HCL to precipitate the diacid and silylating the filtrate.

Resin color was measured by Hunterlab spectrophotometer.

Film color was measured by means of X-Rite Spectrophotometer

Transparency of the film was measured by measuring haze of a single sheet of film substantially in accordance with ASTM D1003.

Intrinsic viscosity (IV) of the film and resin were tested according to ASTM D 460. This test method is for the determination of the inherent viscosity of poly(ethylene terephthalate) (PET) soluble at 0.50% concentration in a 60/40 phenol/1,1,2,2-tetrachloroethane solution by means of a glass capillary viscometer. An IV of 0.65 to 0.75 is considered good for film.

Tensile strength and elongation percent at break of the film were determined according to ASTM D882 using a Tensilon tester.

The Mn, Mg, and P content of the films and resins were measured using a RIGAKU RIX 1000 X-Ray Fluorescent Spectrophotometer (FLX). This non-destructive method consists of irradiating a solid sample with an intense X-ray beam. The sample thus excited absorbs some of the energy and in turn emits X-rays along a spectrum of wavelengths characteristic of the types of atoms present in the sample; and the intensity of these emitted X-rays is proportional to the abundance of the elements in the sample. The desirable range is 50-100 ppm of Mn and/or Mg, and 30-100 ppm of P.

The UVA properties of the polyester films were measured via the use of a Hitachi U-3900H UV/VIS spectrophotometer. UV transmission spectra were taken and the average percentage of total transmittance was calculated from 300 nm to 400 nm and from 310 to 370 nm.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

Raw Materials: UV Absorber Compositions Used in this Application

The additives were used either in their pure form (for the in-situ incorporation experiments) or as compounded masterbatches (20% in PET chip).

A. Cyasorb 3638F

Proper name 2,2'-(1,4-phenylene)bis([3,1]benzoxazin-4-one); Obtained from Cytec.
Chemical Structure:

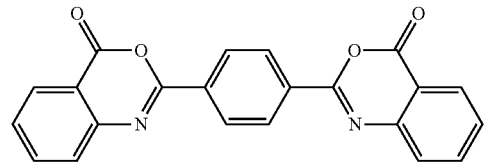 [SMILES: O=c1oc(-c2ccc(-c3nc4ccccc4c(=O)o3)cc2)nc2ccccc12]

Off-white powder with melting point 315° C. Thermogravimetric analysis run under air at atmospheric pressure shows 1% weight loss occurring at 295° C.; 5% weight loss occurring at 316° C. and 10% weight loss at 328° C. Weight loss vs. temperature is plotted in FIG. 1.

B. Tinvun 1577

Proper name: 2-(4,6-diphenyl-1,3,5-triazin-2-yl)-5-hexyloxyphenol. Obtained from BASF.
Chemical Structure:

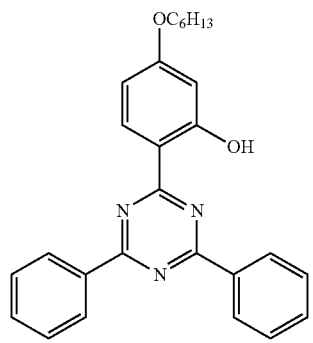

Yellow powder with melting point 148° C. Thermogravimetric analysis run under air at atmospheric pressure shows 1% weight loss occurring at 279° C.; 5% weight loss occurring at 309° C. and 10% weight loss at 326° C. Weight loss vs. temperature is plotted in FIG. 1.

C. Tinvun 1600

Obtained from BASF. Yellow powder with melting point a 69° C. (measured at the onset of the melting peak by Differential Scanning calorimetry at a heating rate of 10° C./min). Thermogravimetric analysis shows superior resistance against volatility, with 1% weight loss occurring at 351° C., 5% at 379° C. Weight loss vs. temperature is plotted in FIG. 1.

The chemical composition is not disclosed by the manufacturer; a patent literature source (WO 2012172372 A1) lists the chemical name for Tinuvin 1600 to be 3-(diaryl)[1,3,5] triazin-2-yl)-5-(alkoxy substituted)-phenol, although the group "alkoxy" is not specifed; that nomenclature (with the exception of "2" instead of "3" as the first character) would match the following general formula cited in U.S. Pat. No. 7,265,171 by Ciba Specialty Chemicals Corporation (former owner of the Tinuvin business before BASF):

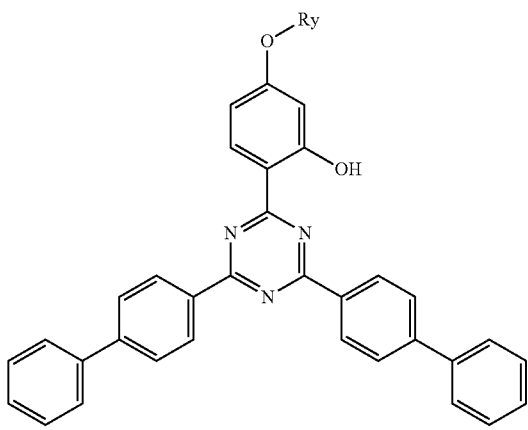

One specific example of that formula also cited in the above patent that matches most closely the melting point measured on Tinuvin 1600 is:

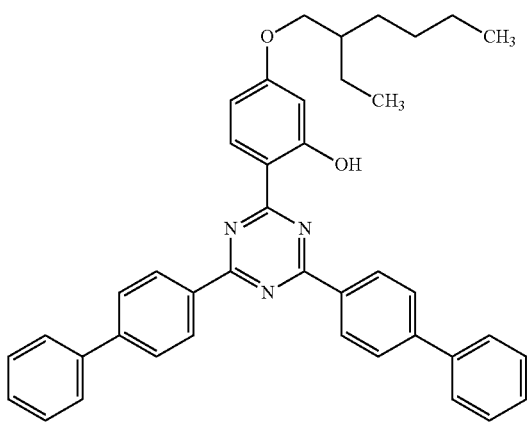 [SMILES: CCCCC(CC)COc1ccc(-c2nc(-c3ccc(-c4ccccc4)cc3)nc(-c3ccc(-c4ccccc4)cc3)n2)c(O)c1]

Chemical name: 2,4-bis-biphenyl-6-[2-hydroxy-4-(2-ethyl-hexyloxy)phenyl]-1,3,5-triazine, Tm=70° C.

Commending with regard to performance vs. acceptability against criteria defined herein for in-situ addition during polymerization:

Regarding stability against thermal decomposition and volatility, since a typical maximum temperature during the esterification stage is around 275° C. and during the polycondensation stage is around 285° C., Tinuvin 1577 and Cyasorb 3638F allow predicting (based on TGA) incorporation yield of at least 95,% whereas Tiuvin 1600 is particularly acceptable with predicted incorporation yield essentially 100%.

With regard to stability against undesirable reactions with the polyester chain or building blocks thereof, a look at the chemical structure suggests that triazine structures (Tinuvin 1577 and 1600 for example) are preferable s. benzophenones (e.g. Cyasorb 3638F): in general, hydroxyl groups directly attached to benzene rings are not particularly reactive with carboxylic groups present in polyester polymerization (which are also in relative scarcity as end-groups after esterification, relative to hydroxyl end-groups which are typically added in excess); on the other hand the two carbonyl groups present in the Cyasorb structure in positions symmetric to each other are generally known to be reactive: see for example Hoffman, R. V., "*Organic Chemistry: an intermediate text*", Oxford University Press (1997), p. "carbonyl compounds are very common carbon electrophiles, by virtue of the polarized carbon-oxygen π bond."

EXAMPLES

Example 1

In-Situ Reactor Incorporation of Tinuvin 1600

A 10-liter stainless steel reactor, equipped with heating mantle, stirrer, addition ports, and overhead distillation column was charged with 1741 grams of ethyleneglycol and 3952 grams of purified terephthalic acid. The reactor was purged with nitrogen to 40 psig and heated at a heater temperature setting of 275° C., while stirring at 55 RPM. During the course of the esterification a back pressure regulator maintained the reactor pressure to 55 psia by letting the gas overhead escape to the overhead distillation column; this resulted in collection of water esterification byproduct from the top of the column and refluxing of the ehthyleneglycol vapors back to the reactor. The temperature at the top of the distillation column stayed at 140° C. (temperature of saturated steam at 55 psia) during the course of the esterification. After 320 min into the reaction, the temperature at the top of the column started dropping, indicating that no more water was evolving, thus that esterification was complete. At that point, the reactor internal temperature had reached 253.9° C.

At that point in time, the reactor pressure was gradually reduced to atmospheric by slowly opening a release valve. Atmospheric pressure was reached at 336 min from the start, at which point catalyst and additive additions took place by injecting in the form of slurry in ethyleneglycol as follows: Antimony Trioxide (polycondensation catalyst): 260 ppm (as antimony) based on stoichiometric polymer mass yield; phosphoric acid (thermal stabilizer): 10 ppm (based on stoichiometric polymer mass yield); TMAH (tetramethylammonium hydroxide—DEG inhibitor): 40 ppm; Tinuvin 1600: 1 wt. % (based on combined total resin weight).

After the additions were complete, vacuum was gradually applied to the reactor by means of a vacuum pump, starting at 378 min into the reaction. The pressure was gradually lowered over the next hour until full vacuum (around 0.2 mm Hg) was reached. Reactor heater was set to 285° C. During this vacuum polycondensation stage the agitator torque was monitored and RPM letdowns were executed every time torque reached an upper limit, as follows:

71 min under full vacuum: From 55 to 50 RPM
75 min under full vacuum: From 50 to 45 RPM
87 min under full vacuum: From 45 to 40 RPM
92 min under full vacuum: From 40 to 35 RPM
96 min under full vacuum: From 35 to 25 RPM
99 min under full vacuum, From 25 RPM to 20 RPM.

At this point polymerization was considered complete based on the torque/RPM target set for meeting target molecular weight based on intrinsic viscosity (IV). Internal reactor temperature had reached 284° C. Vacuum was interrupted and the reactor was discharged through a strand die by means of a gear pump into a water quench bath/strand pelletizing system. The properties of the resulting chip (IV, color, diethylene glycol (DEG) content, analyzed additive content) are listed on Table 1.

The chip was crystallized at 270° F. and then dried overnight at 270° F. using a desiccant air hopper dryer and was extruded through a 6"-wide film die on a 1" lab extruder at melt temperature 300° C. The molten film was cast on a quench roll maintained at 15° C. and taken up at a winding speed resulting in film thickness of 1 mil. The resulting clear film was tested for UV transmission and the results, in terms of transmission averages in the 300-400 nm wavelength range and in the 310-380 nm wavelength range are shown in Table 2.

Example 2

In-Situ Reactor Incorporation of Tinuvin 1577

The polymerization described in example 1 was repeated, however this time the UV absorber incorporated in situ in the form of 20% slurry in ethyleneglycol to a concentration of 1 wt. % based on final polymer weight was Tinuvin 1577. The results of the chip analysis and polymerization time to reach target IV are shown on Table 1.

Clear film was cast by melt extrusion from the resulting chip and tested as described in Example 1. The film properties are shown on Table 2.

Reference Example 1

The polymerization described in example 1 was repeated; however no UV absorber was incorporated. The results of the chip analysis and polymerization time to reach target IV are shown on Table 1.

Clear film was cast by melt extrusion from the resulting chip and tested as described in Example 1. The film properties are shown on Table 3.

TABLE 1

|  | Example | | |
| --- | --- | --- | --- |
|  | Ref. Ex. 1 | Ex. 1 | Ex. 2 |
| UV absorber | None | Tinuvin 1600 | Tinuvin 1577 |
| Target Additive Level, wt. % | 0% | 1% | 1% |
| Vacuum Poly. Time (to constant agitator torque = 14 @ 25 RPM) | 78 min | 98 min | 77 min |
| Chip Color, b* | 3.82 | 9.80 | 8.36 |
| IV, dl/g | 0.64 | 0.64 | 0.63 |
| DEG, wt. % | 1.6 | 1.6 | 1.7 |
| Additive Level, wt. % (confirmed by analyzing final chip) | - | 1.1% | 0.9% |

The measured In-Situ incorporation level of Tinuvin 1600 (essentially 100%) and Tinuvin 1577 (90%) is consistent with their volatility measured by TGA.

Reference Example 2

Tinuvin 1600 Incorporation in Film Extrusion via Compounded Masterbatch

A pellet-to-pellet blend consisting of 95% standard film-grade PET chip (Lumirror F21MP) and 5% "UVQ" masterbatch from Clariant (containing 20 wt. % Tinuvin 1600 that was melt compounded with a PET resin on a twin-screw extruder) was extruded into 1-mil clear amorphous cast film (effectively containing 1 wt. % Tinuvin 1600) using the same equipment and procedure as in Example 1. UV Light transmission was measured and compared against in-situ film containing the same level of Tinuvin 1600 (1 wt. %) in FIG. 2. There is good match with regard to UV blocking between the In-Situ added Tinuvin 1600 and the same concentration of Tinuvin 1600 added via compounded masterbatch.

Reference Example 3

Cyasorb 3638F Incorporation in Film Extrusion via Compounded Masterbatch

A pellet-to-pellet blend consisting of 95% standard film-grade PET chip (Lumirror F21MP) and 5% "UVA" masterbatch from Americhem (containing 20 wt. % Cyasorb 3638F that was melt compounded with a PET resin on a twin-screw extruder) was extruded into 1-mil clear amorphous cast film (effectively containing 1 wt. % Cyasorb 3638F) using the same equipment and procedure as in Example 1. UV Light transmission was measured and compared against in-situ film containing the same level of Tinuvin 1600 (1 wt. %) in FIG. 2. There is inferior performance with regard to UV blocking by the In-Situ added Tinuvin Cyasorb 3638F vs. the same concentration of Cyasorb 3638F added via compounded masterbatch.

Examples 3 and 4

The purpose of these examples is to demonstrate feasibility of early in-situ addition vs. late in-situ addition of Tinuvin 1600.

Example 1 was repeated, however this time the addition level of Tinuvin 1600 was 1.7 wt. % and the additive was added as follows:

| Example 3 ("Late Addition") | In the form of 20 wt. % slurry in ethylene glycol in the atmospheric addition stage between the high pressure esterification and the vacuum polycondensation (same as Example 1). |
| --- | --- |
| Example 4 ("Early Addition") | Upfront as solid powder into the ethyleneglycol/terephthalic acid slurry mix prior to the start of the esterification stage. |

The results of the chip analysis and polymerization time to reach target IV are shown on Table 2.

Clear cast films, 1-mil in thickness, were prepared in a process similar to the one described in Example 1. UV Transmission results are listed on Table 3, showing that the method of addition has little impact on the UV transmission performance.

TABLE 2

|  | Ref. Ex. 1 | Ex. 3 | Ex. 4 | Ex. 4 |
|---|---|---|---|---|
| Additive | None | Tinuvin 1600 | Tinuvin 1600 | Tinuvin 1600 |
| Target Level, wt. % | 0% | 1.7% | 1.7% | 1.74% |
| Addition Mode | - | Late | Early | Early |
| Polymerization Scale, lb | 10 | 10 | 10 | 100 |
| Vacuum Poly. Time to Target Torque at 25 RPM | 78 min | 95 min | 96 min | 117 min |
| Color, b* | 3.82 | 14.0 | 17.6 | 19.2 |
| IV (TPA correlated) | 0.64 | 0.62 | 0.63 | 0.64 |
| DEG, wt. % | 1.6 | 1.7 | 1.6 | 1.5 |
| Confirmed wt. % (NMR Analysis) | - | 1.7% | 1.7% | 1.68% |

TABLE 3

| Example | Additive | Average 1-mil Film UV Transmission, in the range 300-400 nm | Average 1-mil Film UV Transmission, in the range 310-380 nm |
|---|---|---|---|
| Example 1 | 1% Tinuvin 1600 (In-situ; Late Add.) | 21.30 | 8.50 |
| Example 2 | 1% Tinuvin 1577 (In-situ; Late Add.) | 21.02 | 8.68 |
| Reference Example 1 | None | 66.14 | 70.78 |
| Reference Example 2 | 1% Tinuvin 1600 (via "UVQ" masterchip) | 21.56 | 8.44 |
| Reference Example 3 | 1% Cyasorb 3638F (via "UVA" masterchip) | 20.69 | 5.92 |
| Example 3 | 1.7% Tinuvin 1600 (In-situ; Late Add.) | 16.76 | 4.69 |
| Example 4 | 1.7% Tinuvin 1600 (In-situ; Early Add.) | 17.69 | 4.99 |

Example 5

Early In-Situ Addition of 1.74 wt. % Tinuvin 1600: 100-lb Preparation and Biaxial Film Production A 100-liter stainless steel reactor, equipped with heating mantle, stirrer, addition ports, and overhead distillation column was charged with 17281.5 grams of ethyleneglycol, 38,546.7 grams of purified terephthalic acid, and 771 grams of Tinuvin 1600 powder. The reactor was purged with nitrogen and heated to an internal setpoint of 255° C., while stirring at 52 RPM. During the course of the esterification a back pressure regulator maintained the reactor pressure to 55 psia by letting the gas overhead escape to the overhead distillation column; this resulted in collection of water esterification byproduct from the top of the column and refluxing of the ehthyleneglycol vapors back to the reactor. The temperature at the top of the distillation column stayed at 142° C. (temperature of saturated steam at 55 psia) during the course of the esterification. After 306 min into the reaction, the temperature at the top of the column started dropping, indicating that no more water was evolving, thus that esterification was complete. At that point, the reactor internal temperature had reached 253.6° C.

At that point in time, the reactor pressure was gradually reduced to atmospheric by slowly opening a release valve. Atmospheric pressure was reached at 317 min from the start, at which point catalyst and additive additions took place by injecting in the form of slurry in ethyleneglycol as follows: Antimony Trioxide (polycondensation catalyst): 219 ppm (as antimony) based on stoichiometric polymer mass yield; phosphoric acid (thermal stabilizer): 52 ppm; potassium hydroxide (DEG suppressant): 12 ppm as K; magnesium tetrahydrate (pinning agent) 68 ppm as Mg.

After the additions were complete, vacuum was gradually applied to the reactor by means of a vacuum pump, starting at 382 min into the reaction. Internal temperature set-point was raised to 285° C. The pressure was gradually lowered over the next 50 min until full vacuum (around 0.1 mm Hg) was reached. During this vacuum polycondensation stage the agitator torque was monitored and RPM letdowns were executed every time the torque reached an upper limit, as follows:
103 min under full vacuum: From 52 to 45 RPM
105 min under full vacuum: From 45 to 40 RPM
106 min under full vacuum: From 40 to 35 RPM
108 min under full vacuum: From 35 to 30 RPM
115 min under full vacuum: From 30 to 25 RPM
117 min under full vacuum, From 25 RPM to 20 RPM.

At his point polymerization was considered complete based on the torque/RPM target set for meeting target molecular weight/IV. Vacuum was interrupted and the reactor was discharged through a strand die by means of a gear pump into a water quench bath/strand pelletizing system, to form chip A. The properties of the resulting chip (IV, color, DEG content, analyzed additive content) are listed on Table 1.

Two combined 100-lb preps of Resin Chip (A) were crystallized at 270° F. and then dried overnight at 270° F. using a desiccant air hopper dryer and was processed in a three-layer (A/B/A) film extrusion die after combining with other PET-based polyester chips as follows: The chip was combined with other dried polyester chips, either standard homopolymer PET (for the main layer) or particle masterbatches so that the resulting nominal Tinuvin 1600 content in both the core and the skin layers was 1.2 wt. % The other chip types used in the combination were as follows:
Chip (B): standard film grade PET homopolymer chip, type Lumirror F21MP, with an IV of 0.64 dl/g
Resin Chip Combination (C) Proprietary blend of PET masterbatches with organic and inorganic (silica, alumina) particles used to provide surface characteristics such as anti-blocking and scratch resistance, with the particles having a size small enough to maintain high clarity. Such masterbatches are described in more details in U.S. Pat. No. 6,706,387 and U.S. Pat. No. 6,709,740.
The blend combinations used in the two identical skin layers were as follows:
Resin Chip (A): 69.1 wt. %
Resin Chip Combination (C): 30.9 wt. %
The blend combination used in the main layer was as follows:
Resin Chip (A): 69.1 wt. %
Resin Chip (B): 30.9 wt. %
The skin layer blend was extruded at 16.7 lb/hr and melt temperature 541 F. The main layer blend was extruded at 127 lb/hr and melt temperature 545 F. Both streams were fed into the same multichannel die to form an A/B/A coextruded structure cast through a 20" wide slot on a two consecutive quench rolls kept at 70 F.

The resulting cast film was stretched in the machine direction at a ratio of 3.5 by means of heated rolls at max; stretch temperature of 190 F, followed by stretching in the transverse direction, at a ratio of 3.8 on a tender frame going through an oven at max. temperature 200 F, followed by 5% transverse relaxation at 450 F. The resulting biaxially oriented multilayer film had a thickness of 0.92 mil and was tested for UV transmission, color, haze, and tensile properties; subsequently the film was aged in a UV xenon light Atlas weatherometer for 1500 hrs and 3000 hrs, according to procedure ASTM G155-1. The results are listed in Table 4.

Reference Example 4

Tinuvin 1600 Incorporation in Multilayer Biaxially Oriented Film Extrusion via Compounded Masterbatch The film extrusion procedure of Example 4 was repeated, however this time the extruded blends were based on compounded UV masterbatch (Chip (D) containing 20 parts of Tinuvin 1600 and 80 parts by weight PET resin compounded by twin-screw extrusion) instead of In-Situ produced PET modified with Tinuvin 1600 additive:

The blend combinations used in the two identical skin layers were as follows:

Resin Chip (D): 6 wt. %

Resin Chip (B): 63.1 wt. %

Resin Chip Combination (C): 30.9 wt. %

The blend combination used in the main layer was as follows:

Resin Chip (D): 6 wt. %

Resin Chip (B): 94 wt. %

Properties of the resulting film are listed in Table 4.

TABLE 4

| | Multilayer Biaxial Film Example | |
|---|---|---|
| | Ex. 5 | Ref. Ex. 4 |
| Additive | Tinuvin 1600 (In-Situ) | Tinuvin 1600 (via m/b) |
| Target Level, wt. % | 1.20 | 1.20 |
| Measured Level, wt. % | 1.25 | 1.32 |
| Tensile Strength (MD), kg/mm2 | 20.9 | 25.2 |
| % Retained Tensile Strength (MD) after 1500 hr UV aging | 52% | 64% |
| % Retained Tensile Strength (MD) after 3000 UV aging | 45% | 53% |
| Tensile Strength (TD), kg/mm2 | 24.6 | 23.6 |
| % Retained Tensile Strength (TD) after 1500 hr UV aging | 64% | 72% |
| % Retained Tensile Strength (TD) after 3000 UV aging | 46% | 56% |
| Tensile Elongation (MD), % | 131 | 136 |
| % Retained Tensile Elong. (MD) after 1500 hr UV aging | 25% | 61% |
| % Retained Tensile Strength (MD) after 3000 hr UV aging | 11% | 24% |
| Tensile Elongation (TD), % | 105 | 131 |
| % Retained Tensile Elong. (TD) after 1500 hr UV aging | 52% | 70% |
| % Retained Tensile Elong. (TD) after 3000 UV aging | 20% | 28% |

TABLE 5

| | Multilayer Biaxial Film Example | |
|---|---|---|
| | Ex. 5 | Ref. Ex. 4 |
| Additive | Tinuvin 1600 (In-Situ) | Tinuvin 1600 (via m/b) |
| Target Level, wt. % | 1.20 | 1.20 |
| Measured Level, wt. % | 1.25 | 1.32 |
| Film Haze, % | 1.11 | 1.10 |
| Film Haze after 1500 hr UV aging | 1.32 | 1.52 |
| Film Haze after 3000 hr UV aging | 1.87 | 1.51 |
| Film Color, b* | 2.70 | 2.94 |
| Film b* after 1500 hr UV aging | 3.04 | 3.29 |
| Film b* after 3000 hr UV aging | 3.12 | 3.32 |
| Film UV Transmission Average, 300-400 nm | 17.00 | 14.58 |
| UVTavg. (300-400) after 1500 hr UV aging | 16.21 | 14.23 |
| UVTavg. (300-400) after 3000 hr UV aging | 16.20 | 13.65 |
| Film UV Transmission Average, 310-380 nm | 4.778 | 3.172 |
| UVTavg. (310-380) after 1500 hr UV aging | 4.698 | 3.065 |
| UVTavg. (310-380) after 3000 hr UV aging | 4.945 | 2.877 |

These results indicate that the In-situ incorporated Tinuvin 1600 retains about 80% of its effectiveness (based on UVT and tensile retention on the average) vs. that incorporated via masterbatch; this result is satisfactory from the economics standpoint in view of the higher cost of compounded masterbatches.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein in entirety by reference.

We claim:

1. A method for making a UV absorber containing polyester resin (UVACPER) comprising:
    a) selecting a UV absorber that has less than 5 percent weight loss as measured by thermo-gravimetric analysis when heated from room temperature to 300° C./ and substantially no reactive end group that can react with the precursor during the method of making UVACPER; and
    b) adding the UV absorber into a precursor for making the UVACPER prior to a vacuum condensation reaction of the precursor.

2. The method of claim 1, wherein the UV absorber is added into the precursor in a form of slurry.

3. The method of claim 1, wherein the UV absorber is added into the precursor in a form of a solid.

4. The method of claim 1, wherein the UV absorber is added into the precursor in subsequent to an esterification reaction.

5. The method of claim 1 wherein the UV absorber is a triazine compound.

6. The method of claim 1, wherein the triazine compound comprises 2,4-bis-biphenyl-6[2-hydroxy-4-(2-etheyl-hexyloxy)phenyl]-1,3,5-triazine.

7. The method of claim 1 wherein the triazine compound comprises2-(4,6-diphenyl-1,3,5-triazin-2-yl)-5-hexyloxyphenol.

8. The method of claim 1 wherein the base resin is polyethylene terephthalate.

9. The method of claim 1, further comprising polymerization of the precursor to form the UVACPER.

10. The method of claim 1, wherein the UV absorber has no reactive end group that can react with the precursor during the method of making UVACPER.

11. The method of claim 1, further comprising end-capping the UV absorber such that the UV absorber after end-capping has substantially no reactive end group that can react with the precursor during the method of making the UVACPER.

12. The method of claim 1, wherein a yield for polymerization of the UVACPER exceeds 80%.

13. A UV absorber containing polyester resin (UVACPER) comprising a UV absorber and a polyester resin, wherein the UV absorber is incorporated in-situ in the polyester resin, wherein the UV absorber has less than 5 percent weight loss as measured by thermo-gravimetric analysis when heated from room temperature to 300° C. at 20° C./minute, and wherein the UV absorber is at least partially functionalized to the polyester resin due to in-situ incorporation of the UV absorber in the polyester resin.

14. The UVACPER of claim 13, wherein the UV absorber is up to 5 wt. % of the UVACPER.

15. The UVACPER of claim 13, wherein the UV absorber is up to 2 wt. % of the UVACPER.

16. The UVACPER of claim 13, wherein in-situ incorporation of the UV absorber in the polyester resin polyester causes significantly no chemical alteration in the structure of the UV absorber.

17. The UVACPER of claim 13, wherein a base polymer comprises polyethylene terephthalate.

18. A biaxially oriented film comprising the UVACPER of claim 13.

19. The biaxially oriented film of claim 18, wherein abase resin comprises polyethylene terephthalate.

* * * * *